(12) United States Patent
Maas et al.

(10) Patent No.: US 9,114,907 B2
(45) Date of Patent: Aug. 25, 2015

(54) SHOCK SENSITIVE TRANSPORT STABILIZER

(71) Applicants: Frank Maas, Midvale, ID (US);
Barbara E. Maas, Midvale, ID (US)

(72) Inventors: Frank Maas, Midvale, ID (US);
Barbara E. Maas, Midvale, ID (US)

(*) Notice: Subject to any disclaimer, the term of this patent is extended or adjusted under 35 U.S.C. 154(b) by 151 days.

(21) Appl. No.: 14/043,542

(22) Filed: Oct. 1, 2013

(65) Prior Publication Data

US 2014/0091196 A1    Apr. 3, 2014

Related U.S. Application Data

(60) Provisional application No. 61/708,367, filed on Oct. 1, 2012.

(51) Int. Cl.
*B60P 7/08*    (2006.01)
*B65D 19/38*   (2006.01)
*B60P 7/16*    (2006.01)
*A61G 3/00*    (2006.01)

(52) U.S. Cl.
CPC ............... *B65D 19/38* (2013.01); *A61G 3/006* (2013.01); *B60P 7/16* (2013.01)

(58) Field of Classification Search
CPC ........... B60P 7/16; A61G 3/006; B65D 19/38
USPC ........................ 410/86, 87, 88, 66, 67; 5/118; 267/140.11, 140.13, 140.14, 140.15, 267/140.5, 150; 296/19, 20; 248/562, 563, 248/564, 584
See application file for complete search history.

(56) References Cited

U.S. PATENT DOCUMENTS 6,527,263 B1 *  3/2003  Verbrugge .................... 267/150
7,621,705 B2 * 11/2009  Hillberry et al. ................ 410/30

* cited by examiner

*Primary Examiner* — Stephen Gordon
(74) *Attorney, Agent, or Firm* — Robert L. Shaver; Shaver & Swanson, LLP

(57) ABSTRACT

A transport device for shock sensitive packages maintains an object in a near zero gravity spatial orientation to reduce or eliminate potentially harmful mechanical shock and or vibration to a body, object or device needing protection. This device has active impact cancellation, and is controlled by a computer via attached sensors that return positional data and reduce or eliminate the deceleration rate of the protected body via programmed algorithms, and rapidly compensating linear actuators.

19 Claims, 5 Drawing Sheets

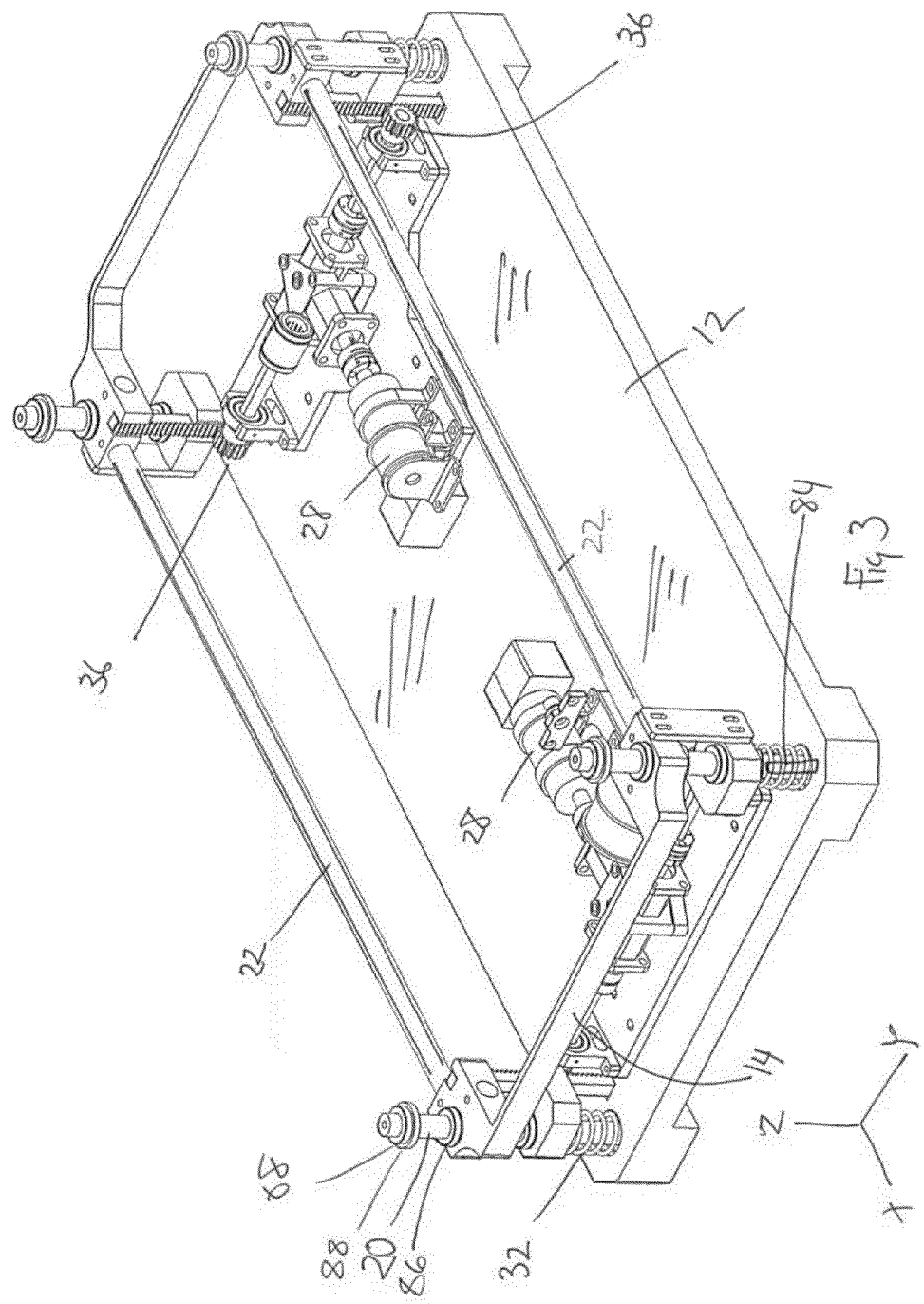

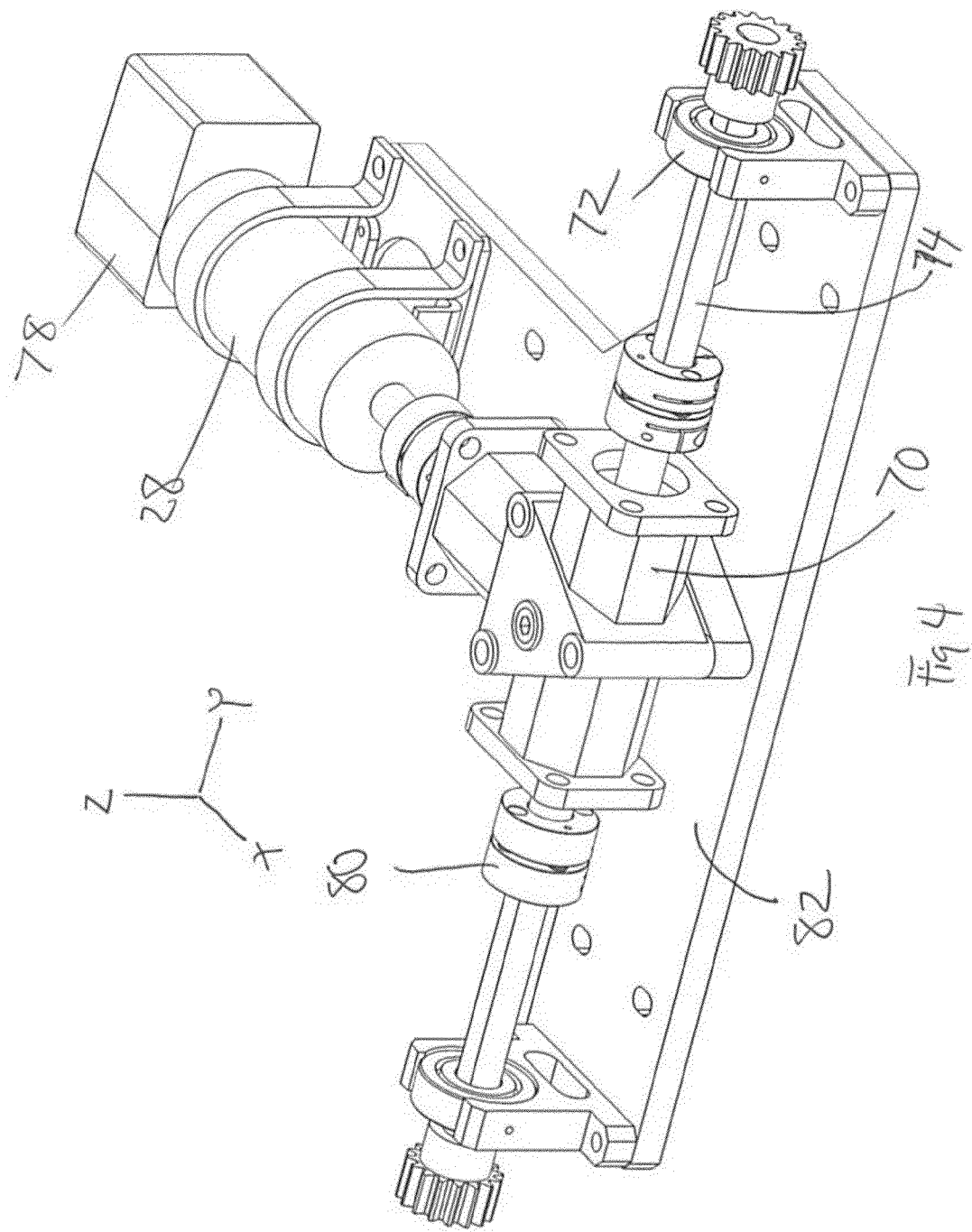

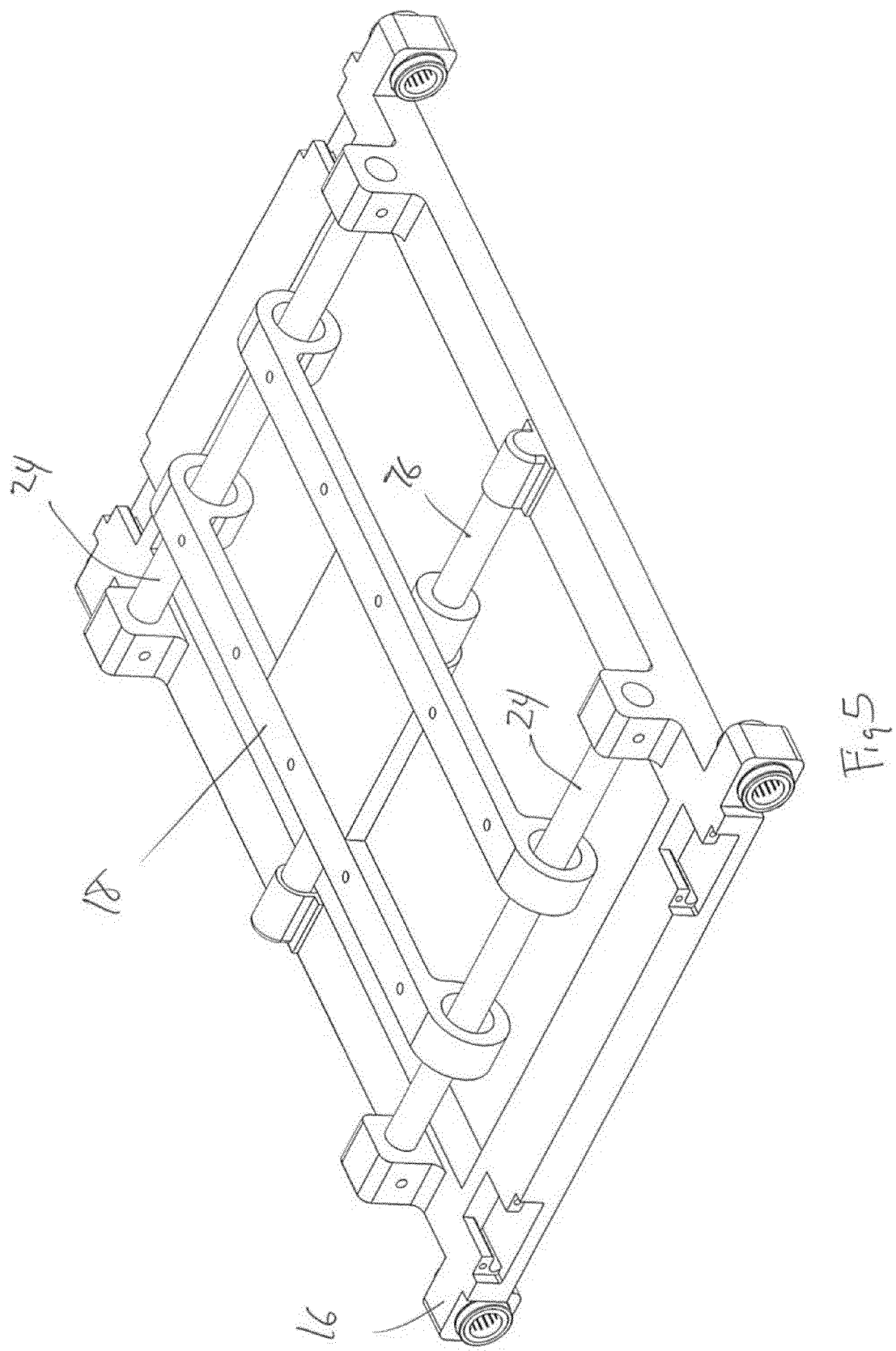

SHOCK SENSITIVE TRANSPORT STABILIZER

PRIORITY/CROSS-REFERENCE TO RELATED APPLICATIONS

This application claims the benefit of U.S. Provisional Application No. 61/708,367, filed Oct. 1, 2012 the disclosure of which is incorporated by reference.

TECHNICAL FIELD

The presently disclosed and claimed inventive concepts generally relate to an apparatus for stabilization, and more particularly to stabilization within a moving vehicle.

BACKGROUND

Certain packages can be very sensitive to shock during transport. An example of such a shock sensitive package is an infant being transported by ground vehicle or by air. During rapid emergency transport, a patient can experience extreme jarring and impact forces. These forces are caused by the transport vehicle experiencing similar impacts due to road conditions or air conditions, and those forces being subsequently transferred into the gurney and possibly into a transport isolette if a critical neonatal patient is involved.

These impacts can cause additional damage and problems with the critical neonatal patient. The delicate nature or reduced strength of the neonatal patient increases the damage sustained from jarring impacts and increases healing time compared to a larger patient.

The impact forces can be reduced through passive means such as foam or springs, but these systems still require significant observations by the vehicle driver in order to mitigate damage that would otherwise occur with the passive system. Passive systems also involve rebound, which is undesirable.

SUMMARY OF THE DISCLOSURE

The disclosed technology is a device which actively compensates for shock forces a shock sensitive package receives. The shock sensitive package can be a transport isolette for transporting a neonatal patient, a shipment of glassware, explosives, electronics, or other shock sensitive material. In one embodiment, the device has a load platform, a device frame, and a control unit. The load platform is a generally planar structure on which an isolette containing an infant, or some other shock sensitive package, is placed. The device frame is made up of a base, and axis frames for each of the three axes in which the device moves for shock compensation. Thus the device has an x axis frame, which moves in the x axis, a y axis frame which moves in the y axis, and a z axis frame, which moves in the z axis. Each of these frames are attached to each other and to the load tray. The load tray can consist of attachment points to which a load is attached. This can be a pallet of goods, a box that is strapped down, or a transport isolette which is physically attached to the device.

The control unit sits on a base plate, to which the systems which provide active shock reduction to the load are attached. The systems which reduce shock include the multiple axis frames, actuators, motors, rack and pinion gears, belts, and sensors which allow for automated motion compensation along three axes of movement.

The first axis frame is the y axis frame. This frame is at the top of the unit, and closest to the load tray or load attachment point, and controls movement along the Y-axis (front to back motion, parallel to the short axis of the device). Next is the x axis frame, which is attached to the y frame axis and supports the y axis frame, and further controls movement along the X-axis (side to side motion, parallel to the long axis). The z axis frame is attached to the x axis frame, and moves within the Z-axis (up and down). Movement along each axis is controlled by a printed circuit board (PCB) controller, such as a solid state PCB. The PCB accepts data from an accelerometer mounted to an unstabilized transport vehicle, such as a gurney or a helicopter. The PCB receives the accelerometer data and sends a command signal to the actuators to compensate for the motion experienced by the accelerometer. The motors can be many types, including brushed or brushless, AC or DC, electric, pneumatic, or hydraulic are examples. A preferred version uses mechanical means to move the axis frames. These are motors, rack and pinion gears, and belts which move the axis frame in a direction to reduce the impact of a shock.

Another preferred embodiment uses compressed gas, such as nitrogen, to power the device. Compressed gas has the advantage of responding very quickly to changes in direction.

Additionally, an accelerometer can be installed on the load itself, which can be the packed, the isolette or the infant. In this configuration the accelerometer readings are compared to analyze and improve the efficiency of the disclosed transport device.

The disclosed transport device also incorporates proximity sensors to alert the PCB that one or more frame pieces are approaching a travel limit. Power can be supplied to the disclosed transport device through various methods, such as batteries. The disclosed transport device can further incorporate a control panel. The control panel can feature a power switch, preferably recessed, as well as digital readouts of various system parameters including how the system is functioning and battery life remaining.

The disclosed technology reduces G forces, including shock, impact, and vibration, to as near to zero as possible by supplying an opposite and equal reaction to any motion that would potentially cause trauma to a shock sensitive package being transported in a vehicle on the ground or in the air. The motion is detected by a sensor which transmits motion data to an electronic control device that, in turn, controls multiple motors that move actuators. These actuators move the transported package on a system of axis frames that are mounted on rails arranged in a three dimensional array. The resulting movement reduces the shock of rapid acceleration or "bump" to an improved G force value.

The actuator for moving each axis frame can be a linear type with a screw device which could be powered by an electric, compressed air or hydraulic motor. It could be a cylinder and piston actuator, pressurized by air or gas, hydraulic fluid, water or other inert liquid medium. Actuator could be a radial, torsion bar actuator powered by an electric, air or hydraulic motor. An electric motor driving through gears plus pulleys and belts is a preferred actuator type.

The transport rails for a framework that supports transported package, and any or all connectors can be made from any suitable metal such as steel, stainless steel, non-ferrous materials such as aluminum and titanium or any polymer fiber or carbon fiber.

Electric motors can be brushed or brushless type, AC or DC. They could be stepper motors with sufficient torque and RPM to move actuators the distance and velocity required. Other motors that are air or hydraulic powered must have the same capabilities required for electric motors. A preferred type of motor is a BLDC (Brush-Less DC), with a Maxon brand, model 250w being found to be suitable.

Position sensors are present and can be any that transmit motion data at high speed to a control device. They can also be of the data acquisition type for recording purposes to later analyze useful data. Accelerometers of the digital type have proven to work well, with a Digi-Key brand Model ADXL34 having proven suitable.

Also present are proximity sensors to sense the proximity of axis frames to the limit of travel on transport rails. Proximity sensors can be magnetic, laser, infrared or any type that transmit proximity data to controller.

Gyroscopes can be used in any plane to detect and transmit motion as torque or twisting, radial motion to controller for attitude stability.

The differential data recording system uses two data acquisition accelerometers, one mounted on an unprotected area of vehicle or the unit base plate, the other one on the final axis frame or on the transported package to continuously evaluate quality and performance of the disclosed transport device by comparing differences between the two. This information can be uploaded to the manufacturer or the user at specified times to know when maintenance services are needed. They can also be used for quality control feed back and for any future revision needed on the disclosed transport device components. This system may use any data recorder including a solid state or hard disk recorder.

The controller serves to control all electronic data from sensors, to evaluate spatial needs and command the three motor sets, one controlling each axis frame to move the transported package to keep transmitted impact to a minimum. The controller has a remote mounted annunciator panel for a safety power switch and readout for battery status, time, time enroute, total hours used and time with highest G force enroute. It can have adjustment controls for setting transported package weight, real time clock and transport device sensitivity.

Power can be from a battery pack of any style compatible with DOT or ATA requirements where non-spill or gel types are used. They can be SLA (Sealed lead-acid) aka (Gel cell), NiCad (Nickel Cadmium), NMh (Nickel Metal hydride), Li (lithium ion), or LiPo (lithium polymer). Each system must have its own type of charge controller with safety shut downs and voltage regulator (built in to the PCB). The use of a multiple, "hot swappable" and combined battery system that has a high capacity discharge time will give ample power to long transport.

Ring magnet ferrites can be used for a dynamic magnetic suspension. This technology is used to cushion and control initial shock and suspend the package being transported while the transport vehicle is in motion.

BRIEF DESCRIPTION OF THE DRAWINGS

FIG. 3 is a perspective view of the base plate and the z axis frame, motors, drive train, and z transport rails.

FIG. 4 is a perspective view of the z axis motor and drive train.

FIG. 5 is a perspective view of the x and y axis frames with a fluid drive system.

DETAILED DESCRIPTION OF THE EXEMPLARY EMBODIMENTS

Figure 1:
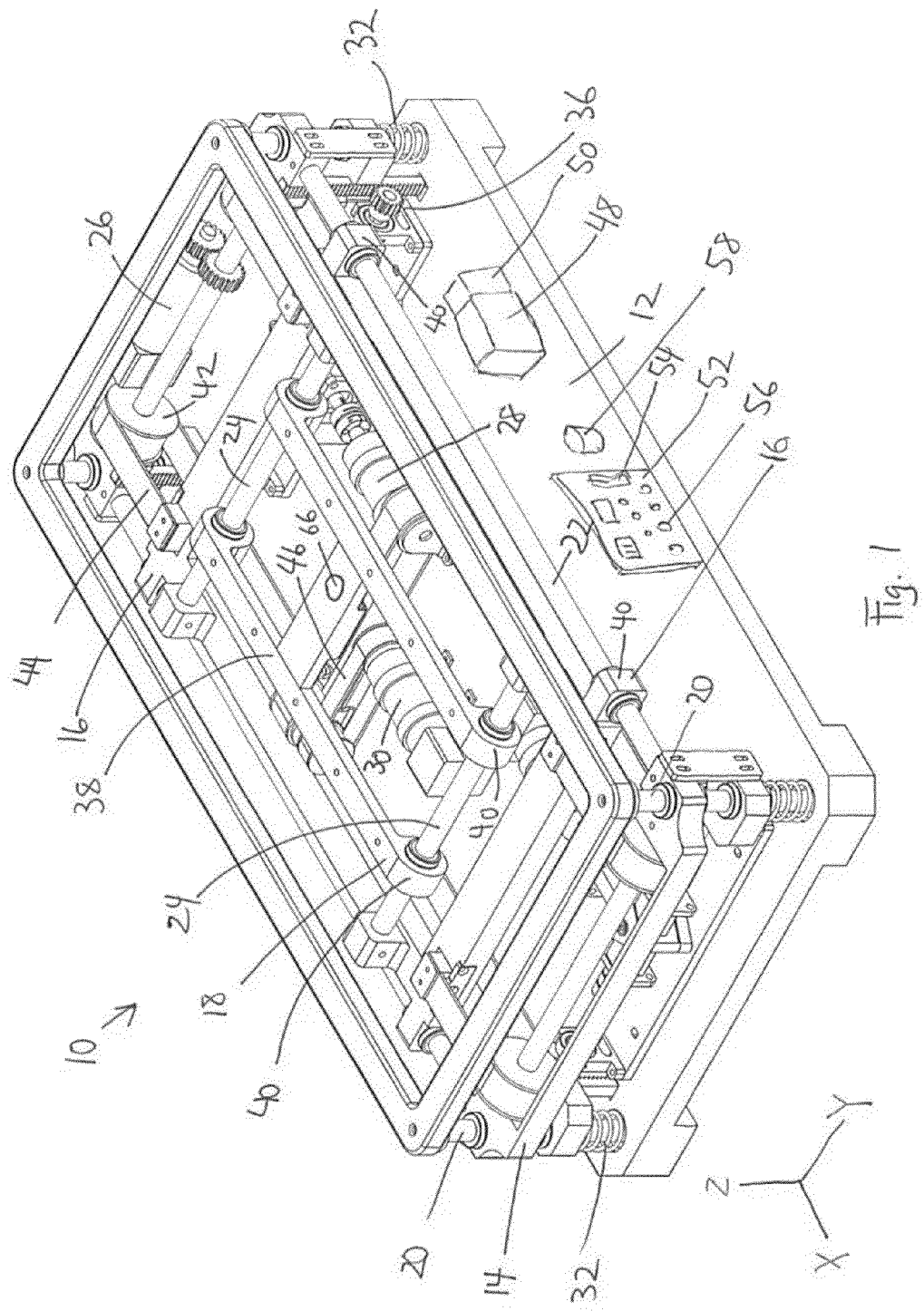
FIG. 1 is a perspective view of the disclosed transport device.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

The disclosed transport device is shown in FIGS. 1-5. FIG. 1 is a perspective view of the transport device 10. Shown is the base plate 12 on which other components are mounted. The base plate 12 can be various sizes depending on the application for which it is designed, but an application designed for use with an infant isolette would typically be 16-18 in. by 28-32 in., and 1 in. thick. The base plate can be made of any suitable material, but a base plate made of Titanium is preferred for weight reduction and having sufficient rigidity. Attached to the base plate 12 are the z-axis frame, the x-axis frame and the y-axis frame, in that order.

Each of these axis frames include a framework which moves over a set of transport rails. As shown in FIG. 1, the z-axis is the vertical component of the transport device. The z-axis frame 14 is configured to move up and down on the z transport rails 20. This movement is controlled by a z-axis motor 28 which is not visible in FIG. 1 but is visible in FIG. 3. The z axis motor in one embodiment uses two synchronized motors, and these operate through z-axis rack and pinion gears 36, in order to move the z axis and the load attachment point 38 up or down in order to reduce a shock which is received in the z-axis. The attachment point 38 can be the point at which a load or load tray attaches, or the load itself can also attach to the attachment point 38 by means of clamps, straps, bolts, or other conventional devices. Included in the z-axis frame, in an example installation, are the z transport rails 20, which could be round and ¾ in. in diameter and made of Stainless Steel. Stop cushioning devices can be utilized at the extreme ends of the transport rails of the device in order to eliminate impact from a frame bumping into the limit stops. These stop cushioning devices can include magnets which would repel each other more and more strongly as they approach each other at the limit of the transport rails. Shown on the z transport rails are springs 32, whose passive cushioning can be added to the active cushioning provided by the motors. The springs can include elastomeric dampers to reduce rebound in the springs.

Also shown in FIG. 1 is the x-axis frame 16. The x-axis frame 16 includes sliders 40, which slide along the x transport rails 22 in order to move the x-axis frame in the x direction back and forth. As was the case in the z-axis frame, the x-axis frame is powered by an x motor 26, which turns a shaft 62, seen best in FIG. 2. The drive pulleys 42 engage a cogged belt 44 which is attached to the x frame and under the power of the belt 44, the x-axis frame moves back and forth on the x transport rails 22 as the sliders 40 travel over the transport rails 22. In this way, the x-axis frame compensates for shock received by the base plate by moving the load attached to the y-axis back and forth in the x direction.

The device shown in FIG. 1 also includes a y-axis frame 18, which is attached to the x-axis frame 16 by sliders 40 and y transport rails 24. The y-axis frame slides back and forth on y-axis transport rails 24 by the use of sliders 40 which slide over the transport rails 24. In this embodiment, the y-axis frame is also powered by a motor, in this case, by a y motor 30 which drives a drive belt 46 which causes the y frame 18 to move back and forth over the sliders 24. Included in the y-axis frame 18 are one or more attachment points 38, to which the load being transported is attached.

FIG. 1 also shows a power supply 48 which can include a battery 50. Also shown is a control panel 52 which includes a power switch 54 and status indicators 56. The status indicators 56 can include LED lights which indicate the status of various components of the device, such as the battery, the motors, and accelerometers. Shown in FIG. 1 is a first position sensor 58 which can be an accelerometer or another type of position sensor such as a gyroscope based device. If the base 12 is securely attached to a transport vehicle, then the first position sensor 58 which shows the impacts that are transmitted from the vehicle to the transport device 10. The first position sensor can be mounted to the base plate 12, or could also be mounted to the vehicle. Either position would allow shocks being transmitted to the transport device to be sensed and allow the transport device to compensate by active reaction to the shock. Shock can include vibration as well as impacts. By comparing that shock to a second position sensor 66, such as one on the y axis, or a similar position sensor which is mounted to the load being transported, the amount of shock that is reduced by the transport device 10 can be observed, and the amount of shock received by the load can be determined.

Figure 2:
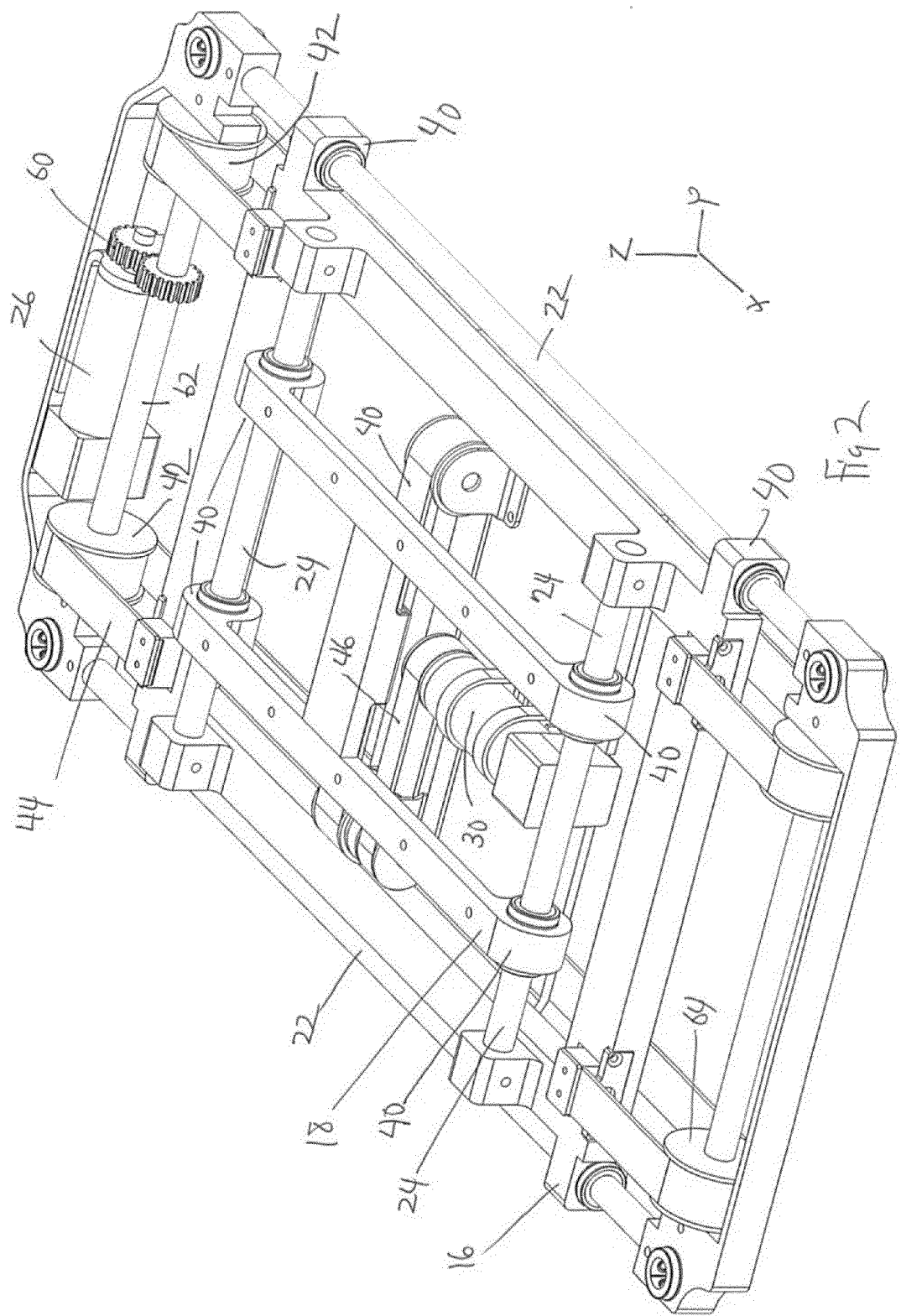
FIG. 2 is a perspective view of the x and y axis frames.

FIG. 2 is a view of the x and y axis frames of the device. Shown more clearly in FIG. 2 are some of the components of these axis frames. Shown is the x-axis frame 16 and the y-axis frame 18. The x-axis frame 16 travels over the x transport rails 22 by means of sliders 40 which travel freely over the transport rail 22. The x-axis frame is moved back and forth by movement of the x motor 26 which operates through x gears 60 to turn an x shaft 62 which turns drive pulleys 42. The drive pulleys 42 travel over an x idler pulley 64 by means of a belt 44 which preferably is cogged or toothed for positive transfer of motion. By moving the belt 44 back and forth over the pulleys 62 and 64, the x frame 16 moves back and forth over the x transport rails 22 by use of the four sliders 40 which move freely over the rail. The movement of the x-axis is triggered by motion that is sensed in the first position sensor 58. Also shown in FIG. 2 is the y-axis frame 18 which also slides over y transport rails 24 by means of sliders 40. The movement of the y-axis frame 18 is directed by the y motor 30 which utilizes a y drive belt 46 which operates over pulleys to operate a cogged belt 44 which also operates over pulleys. Movement of the belt 44 causes movement of the y-axis frame 18 back and forth over the transport rails 24.

Suitable drive components for the axis frames have been found to be electric motors of the BLDC type, with a Maxon brand and 250w model being preferred in certain installations. These operate through steel gears and cogged belts. All of these components can be different sizes for different applications but belts approximately 30 mm wide with a cogged space 8 mm apart and 8 mm wide have been found to be suitable. The range of travel for the z-axis frame is 3½ inches. The range of travel for the x-axis is approximately 6 inches. The range of travel for the y-axis is approximately 4 inches.

FIG. 3 is a view of the base plate 12, to which is mounted the z transport rails 20, on which slides the z axis frame 14. The z transport rails include springs 32 with an elastomeric damper 84 and optional ring magnets 88 for dampening the contact of the z axis frame with the transport limits 68. The z axis frame 14 is powered in this example by paired and synchronized z motors 28, which operate through z axis rack and pinion gears 36. A limit sensor 86 is present in all axis frames to sense travel distance to the transport limit 68, so that the motor or other driver does not crash the axis frame into the transport limit 68.

FIG. 4 shows more detail of a z motor, with a z gearbox 70 and z bearings 72 holding the z drive shaft 74 in place. Also shown in FIG. 4 is a motor control unit 78, shaft coupler 80, and z mounting plate 82, which holds the z motor sub-assembly in place to the base plate 12.

FIG. 5 is an embodiment of the device operated on pneumatic or hydraulic power. Shown in FIG. 5 is the x axis frame 16 and the y axis frame 18. These axis frames are connected to each other in the same way as the motor driven version shown in FIG. 1, but are instead powered by a piston and cylinder combination 76 to which fluid including air or liquid is directed. The piston and cylinder 76 is designated a motor for discussion purposes, and cause the y axis frame to move as shown in FIG. 5, and each of the other axis frames are powered in the same way as is shown for the y axis frame. The rod going through the center of the cylinder is like a one piece rod all the way through with a piston in the center. Both ends of the rod in the piston/cylinder combination are anchored to the y frame, thus driving the y frame back and forth on different axis frames of the device. A combination of motor drive and fluid drive are possible on different axis frames of the device. A motor driving belts over pulleys is preferred, but a motor driving a threaded screw is another actuator system that is a preferred embodiment.

What is claimed is:

1. A shock reducing transport device for attenuating shock to shock sensitive packages during transport by a vehicle, comprising:

a base plate for mounting control and sensing components and for attachment of axis frames;

a plurality of axis frames which allow for three axes of movement, with said axis frames including an x axis frame, a y axis frame, and a z axis frame attached to a device frame, with said axis frames movably attached to each other and at least one of said axis frames attached to said base plate;

at least one position sensor operatively attached to said base plate for sensing environmental shocks to which the vehicle is subjected;

a plurality of motor driven actuators which move said axis frames in each of three planes, to attenuate shock from the transport vehicle from being transmitted to a shock sensitive package;

a control console containing components for reducing shock to said shock sensitive package attached to the transport device, including; at least one PCB controller which converts a signal from said position sensor into commands for movement of said axis frames, and notifications for system functions and at least one power supply;

said axis frames further comprising at least one proximity sensor for each actuator which detects when the axis frames approach an end of a range of axis frame movement; and a load attachment point for securing the shock sensitive package to one of said axis frames;

wherein said frames move said load attachment point in response to shock sensed at the base plate to at least partially absorb motion sensed in said transport vehicle, a gurney, or a litter, and moves one of said frames associated with a respective direction of shock sensed, to reduce shock and motion to the shock sensitive package.

2. The shock reducing device of claim 1 in which said load attachment point is configured for attachment of an infant isolette.

3. The shock reducing device of claim 1 in which said position sensor is a three axis accelerometer.

4. The shock reducing device of claim 1 in which said position sensor is a gyroscope which detects motion in three axes.

5. The device of claim 1 in which each axis frame has at least one of said actuators and a motor.

6. The device of claim 1 in which said control console comprises a power switch.

7. The device of claim one in which said actuators are cogged belts driven by gears from a motor.

8. The device of claim one in which there is a second position sensor attached at a point to sense shock that is transmitted to the shock sensitive package.

9. The device of claim 8 in which said control console further comprises a differential data recording system, in which data of environmental shocks are compared with shocks delivered to the shock sensitive package being transported, to show a reduction of shock transmitted to the shock sensitive package, and a history of shock in transit.

10. The device of claim 1 in which said power supply is a battery pack.

11. The device of claim 1 in which said z axis frame is slidingly attached to said base plate, with said x axis frame slidingly attached to said z axis frame, and with said y axis frame slidingly attached to said x axis frame, with said y axis frame configured for attachment of a shock sensitive package to be transported.

12. The device of claim 1 in which said z axis frame comprises one or more springs to help absorb impact from environmental shocks.

13. The device of claim 12 in which said one or more springs are elastomer dampened to reduce rebound after a shock.

14. The device of claim 1 which further comprises there is at least one magnetic element which cushions and controls an initial shock.

15. The device of claim 1 in which the actuators for moving the axis frames are a cylinder and piston motive system, with a piston moved by a fluid.

16. The device of claim 15 in which the axis frames are moved to absorb and reduce environmental shock by use of compressed gas.

17. A shock reducing transport device for attenuating shock to shock sensitive packages during transport by a vehicle, comprising:

a base plate for mounting control and sensing components and for attachment of axis frames;

a plurality of axis frames which allow for three axes of movement, with said axis frames including an x axis frame, a y axis frame, and a z axis frame attached to a device frame, with said axis frames movably attached to each other and at least one of said axis frames attached to said base plate;

at least one accelerometer operatively attached to said base plate for sensing environmental shocks to which the vehicle is subjected;

a plurality of motor driven actuators comprising a motor, gears, pulleys, and a drive belt which move said axis frames in each of three planes, to attenuate shock from the transport vehicle from being transmitted to a shock sensitive package;

a control console containing components for reducing shock to said shock sensitive package attached to the transport device, including, at least one PCB controller which converts a signal from said accelerometer into commands for movement of said axis frames, and notifications for system functions and at least one power supply;

said axis frames further comprising at least one proximity sensor for each actuator which detects when the axis frames approach an end of a range of axis frame movement; and a load attachment point for securing the shock sensitive package to one of said axis frames;

wherein said frames move said load attachment point in response to shock sensed at the base plate to at least partially absorb motion sensed in said transport vehicle, a gurney, or a litter, and moves one of said frames associated with a respective direction of shock sensed, to reduce shock and motion to the shock sensitive package.

18. The device of claim 17 which further comprises a position sensor attached at a point to sense shock that is transmitted to the shock sensitive package.

19. The device of claim 17 in which said z axis frame is slidingly attached to said base plate, with said x axis frame slidingly attached to said z axis frame, and with said y axis frame slidingly attached to said x axis frame, with said y axis frame configured for attachment of a shock sensitive package to be transported.

\* \* \* \* \*